(12) United States Patent
Lee et al.

(10) Patent No.: US 9,829,611 B2
(45) Date of Patent: Nov. 28, 2017

(54) OPTICAL FILM AND DISPLAY DEVICE COMPRISING THE SAME

(71) Applicant: SAMSUNG DISPLAY CO., LTD., Yongin-si, Gyeonggi-do (KR)

(72) Inventors: Duk Jin Lee, Suwon-si (KR); Jang Seok Ma, Hwaseong-si (KR); Nam Seok Baik, Seongnam-si (KR); Jung Hee Son, Asan-si (KR); Sang Woo An, Asan-si (KR); Gyeong Im Lee, Daegu (KR)

(73) Assignee: Samsung Display Co., Ltd., Yongin-si (KR)

( * ) Notice: Subject to any disclaimer, the term of this patent is extended or adjusted under 35 U.S.C. 154(b) by 56 days.

(21) Appl. No.: 14/788,382

(22) Filed: Jun. 30, 2015

(65) Prior Publication Data

US 2016/0041313 A1 Feb. 11, 2016

(30) Foreign Application Priority Data

Aug. 8, 2014 (KR) .................. 10-2014-0102346

(51) Int. Cl.
G02B 5/02 (2006.01)

(52) U.S. Cl.
CPC ......... *G02B 5/0242* (2013.01); *G02B 5/0263* (2013.01); *G02B 5/0278* (2013.01)

(58) Field of Classification Search
CPC ...... G02B 5/02; G02B 5/0205; G02B 5/0236; G02B 5/0242; G02B 5/0263; G02B 5/0278

USPC .......................................... 359/599
See application file for complete search history.

(56) References Cited

U.S. PATENT DOCUMENTS

| | | | | |
|---|---|---|---|---|
| 6,937,399 | B2* | 8/2005 | Takahashi | G02B 5/0242 359/599 |
| 7,585,094 | B2* | 9/2009 | Chang | G02F 1/133606 362/332 |
| 7,611,262 | B2* | 11/2009 | Chang | G02B 5/0215 362/246 |
| 2003/0164496 | A1 | 9/2003 | Do et al. | |
| 2005/0243428 | A1* | 11/2005 | Takahashi | G02B 5/0242 359/599 |
| 2006/0268571 | A1 | 11/2006 | Harada et al. | |
| 2009/0279175 | A1* | 11/2009 | Laney | G02B 5/0226 359/599 |
| 2013/0062654 | A1 | 3/2013 | Taima et al. | |
| 2015/0049388 | A1* | 2/2015 | Tsuji | G02B 5/0242 359/599 |
| 2015/0131154 | A1* | 5/2015 | Tsuji | G09F 19/14 359/599 |

(Continued)

FOREIGN PATENT DOCUMENTS

| | | | |
|---|---|---|---|
| JP | 2007272065 A | * | 10/2007 |
| JP | 2011-249686 A | | 12/2011 |

(Continued)

*Primary Examiner* — Thomas K Pham
*Assistant Examiner* — Nicholas R Pasko
(74) *Attorney, Agent, or Firm* — Lewis Roca Rothgerber Christie LLP (57) ABSTRACT

An optical film may include a light diffusion portion including light scattering particles dispersed in a light transmissive media, and a light transmission portion including the light transmissive media. The light diffusion portion may be adjacent the light transmission portion.

18 Claims, 10 Drawing Sheets

(56) References Cited

U.S. PATENT DOCUMENTS

2015/0205015 A1* 7/2015 Tsuji ..................... G09F 19/14
                                                    359/599
2016/0291216 A1* 10/2016 Lee ..................... G02B 5/0263

FOREIGN PATENT DOCUMENTS

| JP | WO2011/148823 A1 | 12/2011 | | |
|----|------------------|---------|---|---|
| JP | 2012-123384 A | 6/2012 | | |
| JP | WO 2013146921 A1 * | 10/2013 | ........... | G02B 5/0242 |
| KR | 2003-0070985 A | 9/2003 | | |
| KR | 10-2006-0057582 A | 5/2006 | | |
| KR | 10-2013-0033645 A | 4/2013 | | |

* cited by examiner

OPTICAL FILM AND DISPLAY DEVICE COMPRISING THE SAME

CROSS-REFERENCE TO RELATED APPLICATION

This application claims priority to and the benefit of Korean Patent Application No. 10-2014-0102346, filed on Aug. 8, 2014, with the Korean Intellectual Property Office, the entire content of which is incorporated herein by reference.

BACKGROUND

1. Field

Aspects of the present invention relate to an optical film including a light diffusion portion and a light scattering portion, and a display device including the optical film.

2. Description of the Related Art

Recently, flat panel displays (FPDs) have been developed as display devices. There are various types of FPDs that can display images, such as, for example, liquid crystal displays (LCDs), plasma display panels (PDPs), electroluminescent displays (ELDs), and organic light emitting diode (OLED) displays.

Such display devices include a light diffusion sheet in a display area of a display panel to improve side color shift and side light extraction efficiency.

The light diffusion sheet improves side color shift and side light extraction efficiency in a display device, but front contrast and front color reproducibility of the display device can be lowered.

It is to be understood that this background section is intended to provide useful background for understanding embodiments of the present invention and as such, the background section may include ideas or concepts that were not part of what was known or appreciated by those skilled in the pertinent art prior to corresponding effective filing dates of subject matter disclosed herein.

SUMMARY

Aspects of one or more embodiments of the present invention are directed toward an optical film that prevents or substantially prevents front contrast and color reproducibility in a display device from being lowered and that also improves side color shift and side visibility.

Further, embodiments of the present invention are directed to a display device including the optical film.

According to an embodiment of the present invention, an optical film includes a light diffusion portion including light scattering particles dispersed in a light transmissive media, and a light transmission portion including the light transmissive media. The light diffusion portion may be adjacent the light transmission portion.

The light diffusion portion may have a haze value of 60% or more and the light transmission portion may have a haze value of 50% or less.

The light diffusion portion may have a width and height (e.g., a predetermined width and height) and may alternate with the light transmission portion.

The light diffusion portion may have a width between 10 µm and 30 µm.

The light transmission portion may have a width between 2 µm and 15 µm.

The light diffusion portion may include a first light diffusion pattern having a haze value in a range of 60% to 80% and a second light diffusion pattern having a haze value in a range of 90% to 98%.

The light diffusion portion may further include a third light diffusion pattern having a haze value in a range of 80% to 90%.

The light diffusion portion may be in a mesh form when viewed from the top.

The light transmission portion may be in a mesh form when viewed from the top.

The fight diffusion portion may have a thickness between 20 µm and 60 µm.

A difference between a refractive index of the light transmissive media and a refractive index of the light scattering particles may be in a range of 0.1 to 1.5.

The light scattering particles may include at least one selected from acrylic resin, polystyrene (PS) resin, polyvinyl chloride resin, polycarbonate (PC) resin, polyethylene terephthalate (PET) resin, polyethylene (PE) resin, polypropylene (PP) resin, polyimide (PI) resin, glass, and silica.

The light scattering particles may have an average particle size between 2 µm and 20 µm.

The light transmissive media may include at least one of polyester-based resin, acrylic resin, cellulose-based resin, polyolefin-based resin, polyvinyl chloride resin, polycarbonate-based resin, phenolic resin, and urethane resin.

According to an embodiment of the present invention, a display device includes a display panel and an optical film in a display area of the display panel. The optical film may include a light diffusion portion including light scattering particles dispersed in a light transmissive media, and a light transmission portion including the light transmissive media. The light diffusion portion may be adjacent the light transmission portion.

The light diffusion portion may have a haze value of 60% or more and the light transmission portion may have a haze value of 50% or less.

The light diffusion portion may have a width and height (e.g., a predetermined width and height) and may alternate with the light transmission portion.

The light diffusion portion may include a first light diffusion pattern having a haze value in a range of 60% to 80% and a second light diffusion pattern having a haze value in a range of 90% to 98%.

The light diffusion portion may further include a third light diffusion pattern having a haze value in a range of 80% to 90%.

The light diffusion portion may have a mesh form when viewed from the top.

According to embodiments of the present invention, an optical film includes a light diffusion portion and a light transmission portion which are adjacent each other, which results in enhanced light diffusion and front light transmission. Therefore, a display device including an optical film according to embodiments of the present invention may achieve improved front contrast and color reproducibility and may also achieve improved side color reproducibility and side visibility.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Hereinafter, embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, certain elements or shapes may be simplified or exaggerated to better illustrate the present invention, and other elements present in an actual product may also be omitted. Thus, the drawings are intended to facilitate the understanding of the present invention. Like reference numerals refer to like elements throughout the specification. It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept. Expressions such as "at least one of," when preceding a list of elements, modify the entire list of elements and do not modify the individual elements of the list. Further, the use of "may" when describing embodiments of the present invention refers to "one or more embodiments of the present invention." When a first element is described as being "coupled" or "connected" to a second element, the first element may be directly "coupled" or "connected" to the second element, or one or more other intervening elements may be located between the first element and the second element. Spatially relative terms, such as "beneath", "below", "lower", "downward", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In addition, when a layer or element is referred to as being "on" another layer or element, the layer or element may be directly on the other layer or element, or one or more intervening layers or elements may be interposed therebetween.

Hereinafter, a first embodiment of the present invention will be described with reference to FIGS. 1 and 2.

Figure 1:
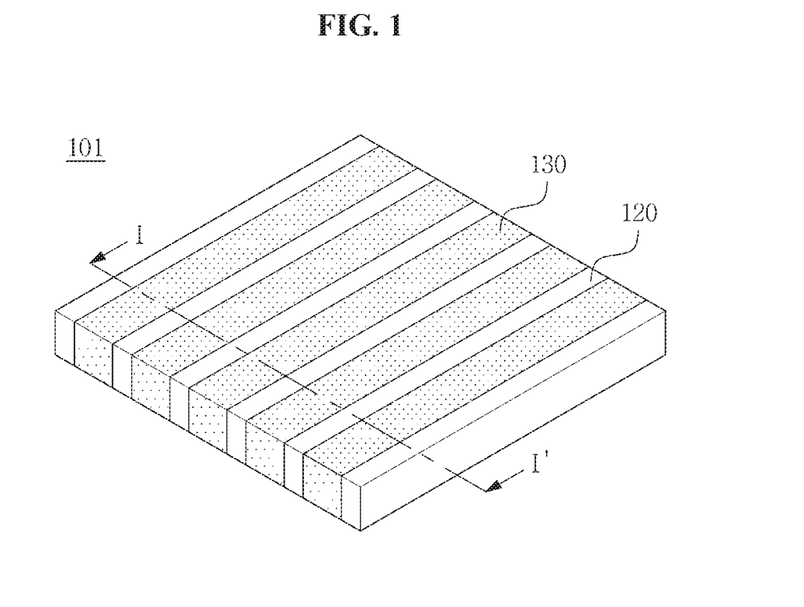
FIG. 1 is a perspective view illustrating an optical film according to a first embodiment of the present invention.

FIG. 1 is a perspective view illustrating an optical film 101 according to the first embodiment of the present invention. FIG. 2 is a cross-sectional view taken along the line I-I' of FIG. 1.

The optical film 101 according to the first embodiment includes a light transmission portion 120 and a light diffusion portion 130. The light transmission portion 120 may include a light transmissive media 111. The light diffusion portion 130 may also include the light transmissive media 111 and may further include light scattering particles 112 dispersed in the light transmissive media 111. Further, the light diffusion portion 130 may be disposed adjacent to light transmission portion 120.

The light transmissive media 111 may be made of a light-transmissive resin through which light is transmitted. Any material that has light transmission may be used to form the light transmissive media 111, without limitation. The light transmissive media 111 may include one kind or more of, for example, polyester-based resin, acrylic resin, cellulose-based resin, polyolefin-based resin, polyvinyl chloride resin, polycarbonate-based resin, phenolic resin, and urethane resin, which are characterized by light weight, low cost, and ease of handling. Among these, the light transmissive media 111 may be made of polyester-based resin, polycarbonate-based resin, or acrylic resin, which has a good balance between strength and flexibility.

Polyester-based resins may be prepared from an aromatic monomer such as terephthalic acid, isophtallic acid, and naphthalenedicarboxylic acid and/or glycol.

Polycarbonate-based resins may be prepared by reaction of a bisphenol with a diaryl carbonate and/or melt transesterification.

Acrylic copolymers may be used as acrylic resins. The acrylic copolymers may be copolymers in which (meth) acrylate monomers with an alkyl group having 1 to 14 carbon atoms are polymerized with monomers involving crosslinking functional groups. As used herein, the term "(meth)acrylate" may include "acrylate" or "methacrylate".

Examples of the (meth)acrylate monomers with an alkyl group having 1 to 14 carbon atoms may include methyl (meth)acrylate, ethyl(meth)acrylate, n-butyl(meth)acrylate, s-butyl(meth)acrylate, tert-butyl(meth)acrylate, isobutyl (meth)acrylate, hexyl(meth)acrylate, 2-ethylhexyl(meth) acrylate, n-octyl(meth)acrylate, isooctyl(meth)acrylate, n-nonyl(meth)acrylate, isononyl (meth)acrylate, n-decyl (meth)acrylate, isodecyl(meth)acrylate, n-dodecyl(meth) acrylate, n-tridecyl(meth)acrylate, n-tetradecyl(meth)acrylate, pentafluoro octylacrylate, and/or 6-(1-naphthyloxy)-1- hexylacrylate, and these may be used either alone or in combination with two or more types thereof.

Examples of the monomers involving crosslinking functional groups may include a monomer containing a sulfonic acid group, a monomer containing a phosphoric acid group, a monomer containing a cyano group, a vinyl ester, an aromatic vinyl compound, a monomer containing a carboxyl group, a monomer containing an acid anhydride group, a monomer containing a hydroxyl group, a monomer containing an amide group, a monomer containing an amino group, a monomer containing an imide group, a monomer containing an epoxy group, and/or a monomer containing an ether group, and these may be used either alone or in combination with two or more types thereof.

The light scattering particles 112 may act to scatter and diffuse light. Any material that enables light scattering may be used as the light scattering particles 112, without limitation. The particle size and amount of the light scattering particles 112 used may affect a haze value and light diffusion efficiency of the light diffusion portion 130.

As the particle size of the light scattering particles 112 decreases, the haze value may be increased when the same or substantially the same amount of particles is used. However, dispersibility of the light scattering particles 112 may be lower with the decrease in the particle size of the light scattering particles 112.

When the light scattering particles 112 have an average particle size of less than 1 μm, their compatibility with the light transmissive media 111 may be lower. When the light scattering particles 112 have an average particle size of greater than 5 μm, light scattering may not be highly increased when the same or substantially the same quantity of particles is used and it may be difficult to make the optical film 101 with a small thickness. Accordingly, the light scattering particles 112 may have an average particle size in a range (or between) of 1 μm to 5 μm. However, the average particle size of the light scattering particles 112 is not necessarily limited to the above range. The average particle size of the light scattering particles 112 may vary depending on how the light scattering particles 112 are used.

Further, the light scattering particles 112 may not be particularly limited in their shape. The light scattering particles 112 may each have, for example, a spherical or oval shape.

In the light diffusion portion 130, the light scattering particles 112 may be used in an amount of 5 to 50 parts by weight or in an amount of 20 to 40 parts by weight per 100 parts by weight of the light transmissive media 111. When the light scattering particles 112 constitute less than 5 parts by weight per 100 parts by weight of the light transmissive media 111, light scattering may not be efficiently performed. When the light scattering particles 112 constitute greater than 50 parts by weight per 100 parts by weight of the light transmissive media 111, light transmission or durability of the optical film 101 may be lowered.

The light scattering particles 112 may include, but are not limited to, at least one acrylic resin, polystyrene (PS) resin, polyvinyl chloride resin, polycarbonate (PC) resin, polyethylene terephthalate (PET) resin, polyethylene (PE) resin, polypropylene (PP) resin, polyimide (PI) resin, glass, and silica. In one embodiment, the light scattering particles 112 may include polystyrene (PS) resins. Polystyrene (PS) resins may include styrene polymers or acrylic-styrene copolymers.

A refractive index of the light scattering particles 112 may be higher or lower than a refractive index of the light transmissive media 111. A path of light through the light scattering particles 112 and a degree of light diffusion may vary depending on the difference in refractive indices between the light scattering particles 112 and the light transmissive media 111 (see FIGS. 8 and 9).

The refractive index of the light scattering particles 112 may be adjusted so as to adjust light diffusion properties and haze values of the light diffusion portion 130.

The difference between the refractive index of the light scattering particles 112 and the refractive index of the light transmissive media 111 may be in a range of 0.1 to 1.5. When the refractive index difference between the light scattering particles 112 and the light transmissive media 111 is less than 0.1, a light scattering effect may be low, and when the refractive index difference between the light scattering particles 112 and the refractive index of the light transmissive media 111 is greater than 1.5, excessive light refraction may occur and it may be disadvantageous to side light extraction.

In one embodiment, the light transmissive media 111 may have a refractive index in a range of 1.4 to 1.6 and the light scattering particles 112 may have a refractive index in a range of 1.3 to 3.0.

Figure 2:
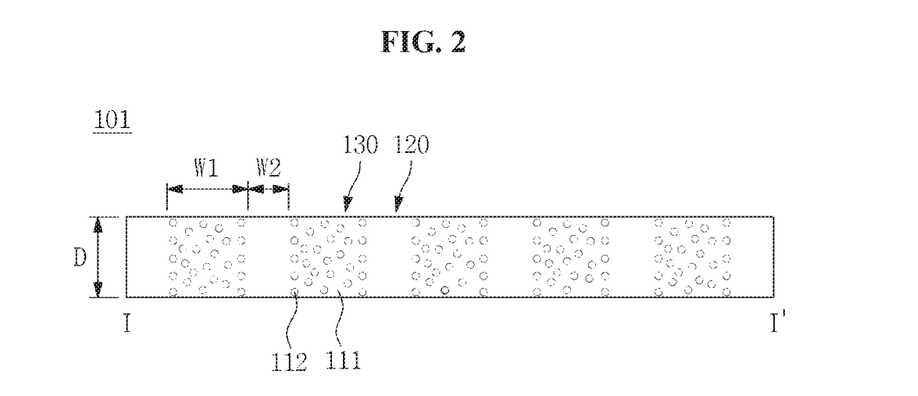
FIG. 2 is a cross-sectional view taken along the line I-I' of FIG. 1.

Referring to FIGS. 1 and 2, a plurality of light diffusion portions 130 having a width W1 (e.g., a predetermined width W1) and height D (e.g., a predetermined height D) may alternate with a plurality of light transmission portions 120.

The light diffusion portion 130 may have a width W1 in a range of (or between) 10 μm to 30 μm.

The light transmission portion 120 may have a width W2 in a range of (or between) 2 μm to 15 μm. The width W2 of the light transmission portion 120 may be equal to a distance between the light diffusion portions 130.

The light transmissive media 111 may have a thickness ID in a range of (or between) 20 μm to 100 μm. The thickness D of the light transmissive media 111 may be 20 μm or greater so as to impart mechanical physical properties and thermal resistance to the light transmissive media 111. Further, the thickness D of the light transmissive media 111 may be 100 μm or less so as to achieve flexibility and slimness of the light transmissive media 111.

The light diffusion portion 130 may have a thickness D in a range of (or between) 20 μm to 100 μm.

Light diffusion may usually occur in the light diffusion portion 130 and may also occur in the light transmission portion 120. Further, light transmission may occur in the light transmission portion 120 and also in the light diffusion portion 130. According to the first embodiment of the present invention, the light diffusion portion 130 may be differentiated (or distributed) from the light transmission portion 120 based on a haze value. For instance, the light diffusion portion 130 may have a haze value of 60% or greater and the light transmission portion 120 may have a haze value of 50% or less.

The haze value is calculated from the ratio of diffused light to the total light transmitted through a specimen. That is, the haze value of a specimen can be calculated using the following equation.

$$\text{Haze (\%)} = [(\text{Diffused light})/(\text{Total light transmitted})] \times 100$$

Effective diffusion of light may occur when the light diffusion portion 130 has a haze value of 60% or greater. When the haze value of the light diffusion portion 130 is high, total light transmittance of the light diffusion portion 130 may decrease and side emission of light may significantly increase proportionally. Accordingly, the haze value of the light diffusion portion 130 may be 98% or less. That is, the light diffusion portion 130 may have a haze value in a range of 60% to 98%. In one embodiment, the light diffusion portion 130 may have a haze value in a range of 90% to 98%.

In the case where an optical film including the light diffusion portion 130 is disposed in a display area on a display surface of a display panel included in a display device, side color shift of the display device may be reduced and side visibility thereof may be improved. However, when the optical film of which the entire surface includes only the light diffusion portion is disposed on the display surface of the display panel, contrast and color reproducibility of the display device may be lowered.

In order to address this issue, the optical film 101 according to the first embodiment may include the light transmission portion 120 between the light diffusion portions 130. Light transmitted through the light transmission portion 120 may have a high front surface transmittance compared to light transmitted through the light diffusion portions 130. As described above, when the light transmission portion 120 and the light diffusion portions 130 are alternately disposed adjacent each other, color mixing may be easily performed by a mixture of front-facing light and side-facing light, and thus color differences between the front-facing light and the side-facing light may be reduced.

Hereinafter, a second embodiment of the present invention will be described with reference to FIG. 3.

Figure 3:
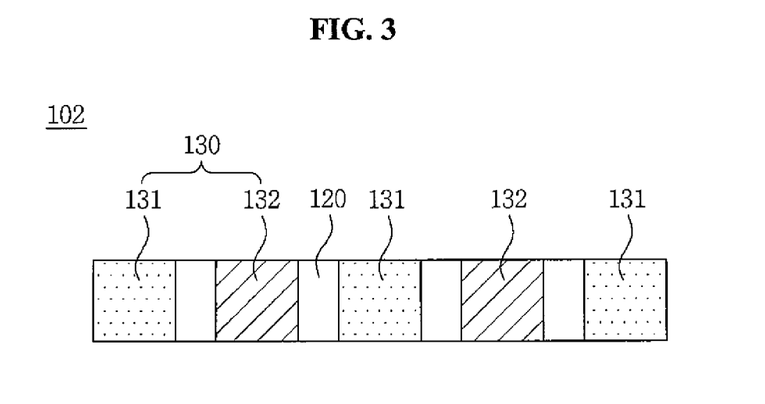
FIG. 3 is a cross-sectional view illustrating an optical film according to a second embodiment of the present invention.

FIG. 3 is a cross-sectional view illustrating an optical film 102 according to the second embodiment of the present invention. The light diffusion portion 130 of the optical film 102 may include a first diffusion pattern 131 and a second diffusion pattern 132.

The first diffusion pattern 131 may have a haze value in a range of 60% to 80% and the second diffusion pattern 132 may have a haze value in a range of 90% to 98%. A diffusion rate of light transmitted through the first diffusion pattern 131 may be lower than a diffusion rate of light transmitted through the second diffusion pattern 132.

The optical film 102 according to the second embodiment may have a structure in which the first diffusion pattern 131 having a low diffusion rate (e.g., a relatively low diffusion rate), the light transmission portion 120 having a very low diffusion rate (e.g., a relatively very low diffusion rate), the second diffusion pattern 132 having a high diffusion rate (e.g., a relatively high diffusion rate), and the light transmission portion 120 having a very low diffusion rate (e.g., a relatively very low diffusion rate) are sequentially arranged.

As described above, the optical film 102 may have a structure in which regions where light diffusion is dominant and where light transmission is dominant are alternately arranged. Therefore, when light is transmitted through the optical film 102, straight light and diffused light may be efficiently mixed with each other. Accordingly, a difference between front-facing visibility and side-facing visibility may be reduced in a display device including the optical film 102.

Hereinafter, a third embodiment of the present invention will be described with reference to FIG. 4.

Figure 4:
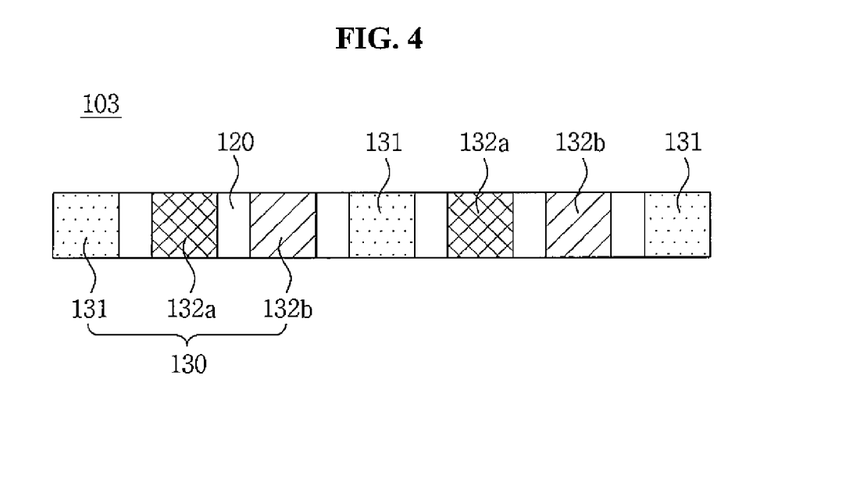
FIG. 4 is a cross-sectional view illustrating an optical film according to a third embodiment of the present invention.

FIG. 4 is a cross-sectional view illustrating an optical film 103 according to the third embodiment of the present invention. The light diffusion portion 130 of the optical film 103 may include a first diffusion pattern 131 and second diffusion patterns 132a and 132b. The first diffusion pattern 131 may have a haze value in a range of 60% to 80% and the second diffusion patterns 132a and 132b may have a haze value in a range of 90% to 98%.

For example, the optical film 103 according to the third embodiment may have a structure in which the first diffusion pattern 131, the light transmission portion 120, the second diffusion pattern 132a, the light transmission portion 120, the second diffusion pattern 132b, and the light transmission portion 120 are sequentially arranged. That is, the light transmission portions 120 may be repeatedly disposed between one first diffusion pattern 131 having a relatively low haze value and two second diffusion patterns 132a and 132b having a relatively high haze value, such that the optical film 103 according to the third embodiment may be formed.

As described above, the optical film 103 according to the third embodiment may have a structure in which regions where light diffusion is dominant and where light transmission is dominant are alternately arranged. Therefore, when light is transmitted through the optical film 103, straight light and diffused light may be efficiently mixed with each other.

Hereinafter, a fourth embodiment of the present invention will be described with reference to FIG. 5.

Figure 5:
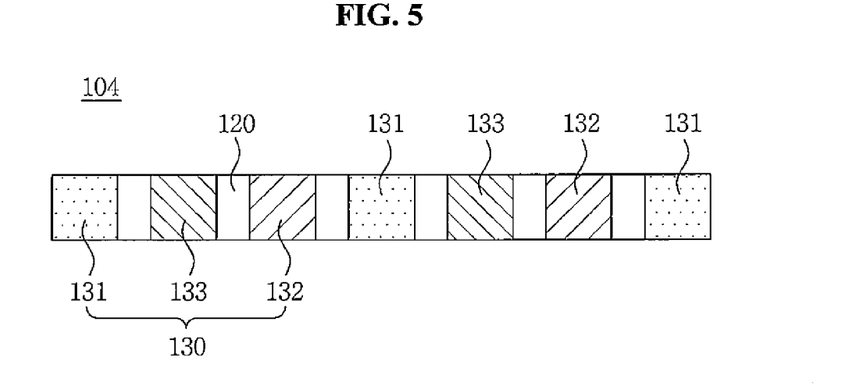
FIG. 5 is a cross-sectional view illustrating an optical film according to a fourth embodiment of the present invention.

FIG. 5 is a cross-sectional view illustrating an optical film 104 according to the fourth embodiment of the present invention. The light diffusion portion 130 of the optical film 104 may include a first diffusion pattern 131 and a second diffusion pattern 132, and a third diffusion pattern 133. The first diffusion pattern 131 may have a haze value in a range of 60% to 80%, the second diffusion pattern 132 may have a haze value in a range of 90% to 98%, and the third diffusion pattern 133 may have a haze value in a range of 80% to 90%.

In more detail, the optical film 104 according to the fourth embodiment may have a structure in which the first diffusion pattern 131, the light transmission portion 120, the third diffusion pattern 133, the light transmission portion 120, the second diffusion pattern 132, and the light transmission portion 120 are sequentially arranged.

Hereinafter, a fifth embodiment of the present invention will be described with reference to FIG. 6.

Figure 6:
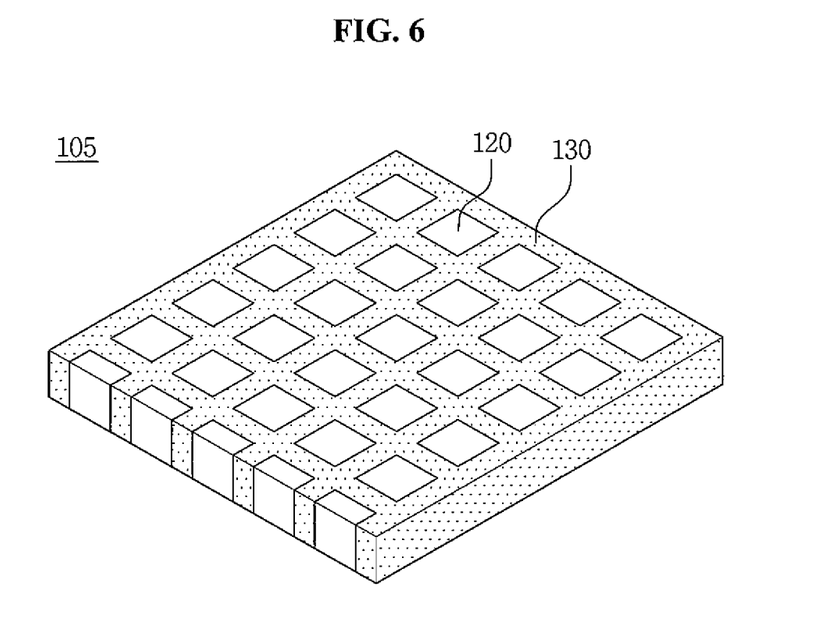
FIG. 6 is a perspective view illustrating an optical film according to a fifth embodiment of the present invention.

FIG. 6 is a perspective view illustrating an optical film according to the fifth embodiment of the present invention. The light diffusion portion 130 of the optical film 105 according to the fifth embodiment may be formed in a mesh structure when viewed from the top. The light transmission portion 120 may have the form of an island or islands between the light diffusion portion 130 having a mesh structure.

The light transmission portion 120 may be disposed adjacent to the light diffusion portion 130 in the optical film 105 according to the fifth embodiment. Therefore, when light is transmitted through the optical film 105, straight light and diffused light may be efficiently mixed with each other.

Hereinafter, a sixth embodiment of the present invention will be described with reference to FIG. 7.

Figure 7:
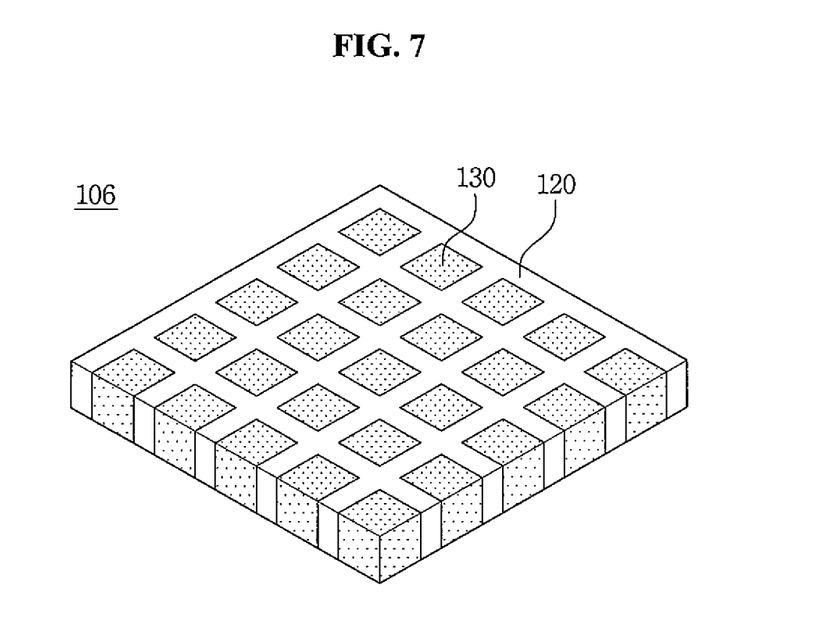
FIG. 7 is a perspective view illustrating an optical film according to a sixth embodiment of the present invention.

FIG. 7 is a perspective view illustrating an optical film according to the sixth embodiment of the present invention. The light transmission portion 120 of the optical film 106 according to the sixth embodiment may have a mesh structure when viewed from the top. The light diffusion portion 130 may have the form of an island or islands between the light transmission portion 120 having a mesh structure.

The light transmission portion 120 may be disposed adjacent to the light diffusion portion 130 in the optical film 106 according to the sixth embodiment. Therefore, when light is transmitted through the optical film 106, straight light and diffused light may be efficiently mixed with each other.

Figure 8:
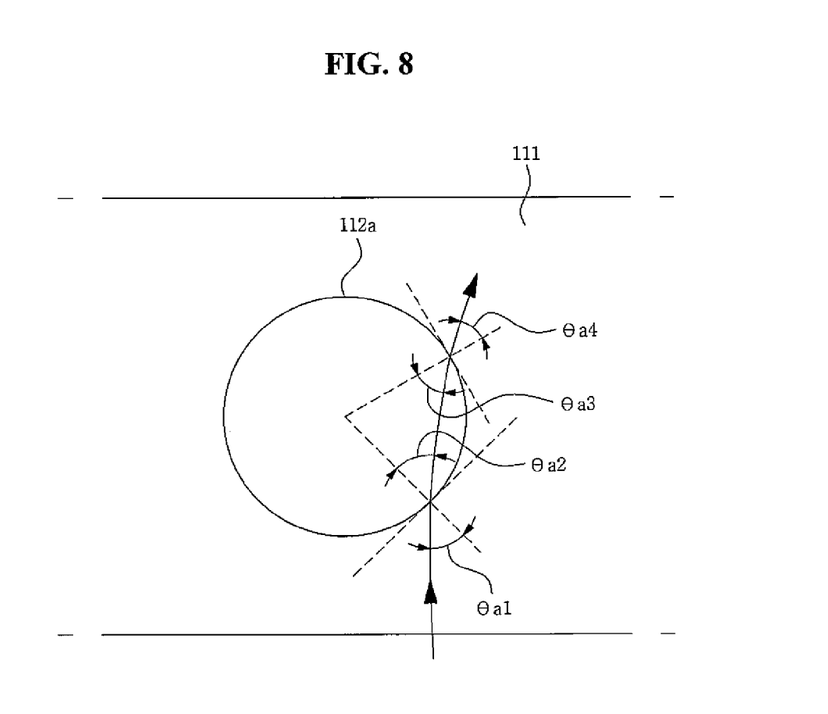
FIGS. 8 and 9 are mimetic diagrams illustrating a path of light passing through light scattering particles.
Figure 9:
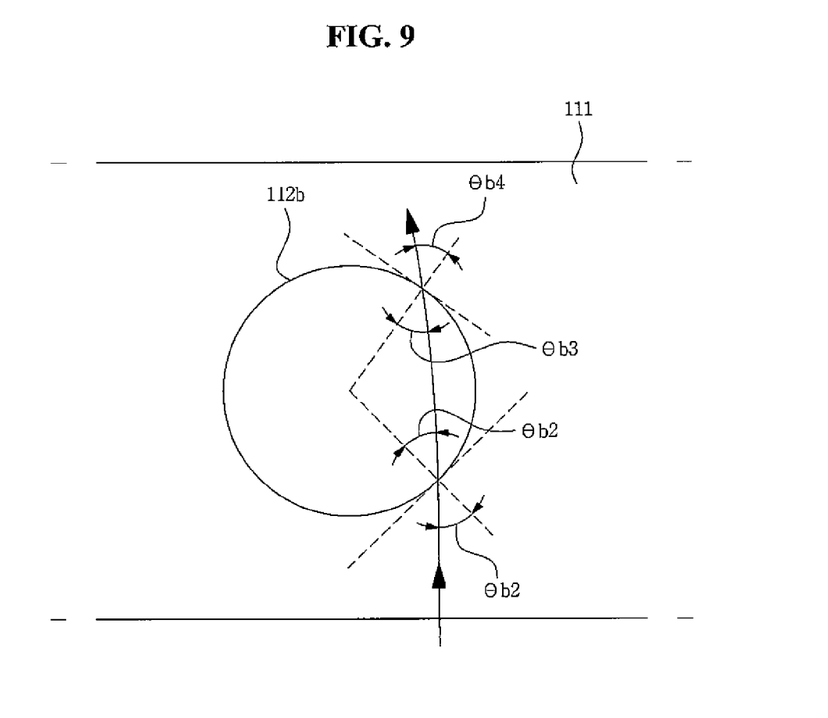

FIGS. 8 and 9 are mimetic diagrams illustrating a path of light passing through light scattering particles 112a and 112b, respectively, dispersed in the light transmissive media 111.

In FIG. 8, a refractive index of the light scattering particle (or particles) 112a may be lower than a refractive index of the light transmissive media 111. Light incident on a point of the light scattering particle 112a at an angle of θa1 may be refracted at an angle of θa2, and thereafter the light may be incident on another point of the light scattering particle 112a at an angle of θa3 towards the light transmissive media 111 and may be then refracted at an angle of θa 4. Referring to FIG. 8, the light incident on the light scattering particle 112a may be refracted in the right direction with respect to the direction in which the light is incident and may be emitted.

In FIG. 9, a refractive index of the light scattering particle (or particles) 112b may be higher than a refractive index of the light transmissive media 111. Light incident on a point of the light scattering particle 112b at an angle of θb1 may be refracted at an angle of θb2, and thereafter the light may be incident on another point of the light scattering particle 112b at an angle of θb3 towards the light transmissive media 111 and may be then refracted at an angle of θb4. Referring to FIG. 9, the light incident on the light scattering particle 112b may be refracted in the left direction with respect to the direction in which the light is incident and may be emitted.

Hereinafter, a path of light incident on the light diffusion portion 130 will be described in further detail with reference to FIG. 10.

Figure 10:
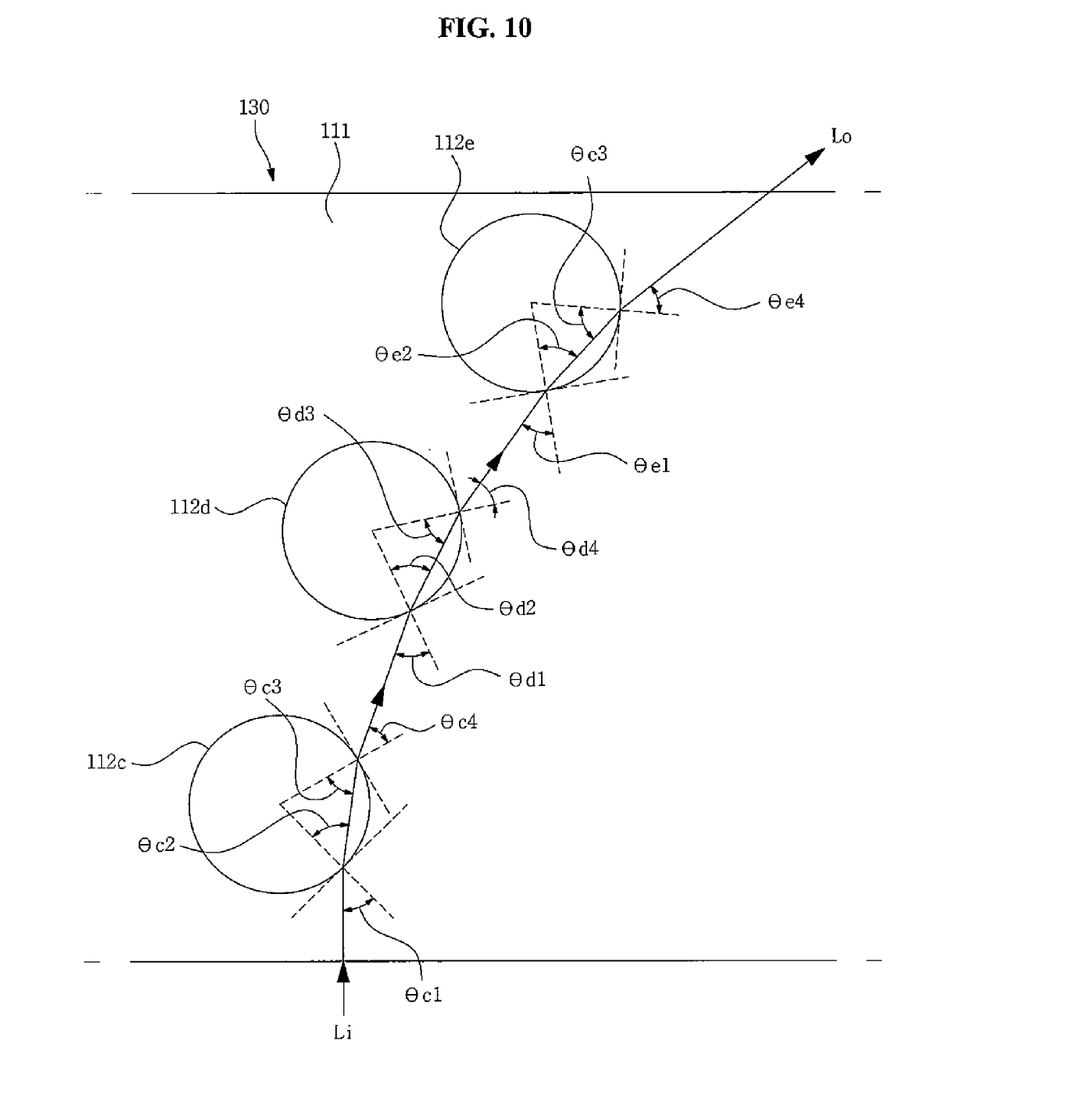
FIG. 10 is a mimetic diagram illustrating a path of light passing through a light diffusion portion.

FIG. 10 is a mimetic diagram illustrating a path of light passing through light scattering particles 112c, 112d, and 112e dispersed in the light diffusion portion 130, and incident light (Li) that passes through the first, second, and third light scattering particles 112c, 112d, and 112e and is consequently emitted as an emitted light (Lo).

The incident light (Li) may be incident on the light diffusion portion 130, and thereafter it may be incident on a point of the first light scattering particle (or particles) 112c at an angle of θc1 and may be refracted at an angle of θc2, and thereafter it may be incident on another point of the first light scattering particle 112c at an angle of θc3 towards the light transmissive media 111 and may be refracted at an angle of θc4. Next, the incident light Li may be repeatedly incident and refracted at an angle of θd1, θd2, θd3, or θd4 while passing through the second light scattering particle (or particles) 112d, and it may be also repeatedly incident and refracted at an angle of θe1, θe2, θe3, or θe4 while passing through the third light scattering particle (or particles) 112e. As a result, the incident light (Li) may be emitted as the emitted light (Lo) from the light diffusion portion 130, where the path of the emitted light (Lo) may be at an angle (e.g., a predetermined angle) that is different from the angle of incidence of the incident light (Li).

Hereinafter, a first method of manufacturing the optical film 101 according to the first embodiment will be described with reference to FIGS. 11A to 11C.

Figure 11A:
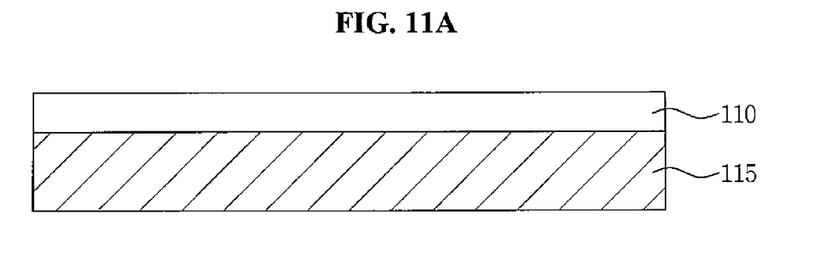
FIGS. 11A to 11C are schematic diagrams illustrating a first method for manufacturing an optical film.

A light transmissive media-forming composition 110 may be coated on a release sheet 115 in the form of a film or films (see FIG. 11A).

Figure 11B:
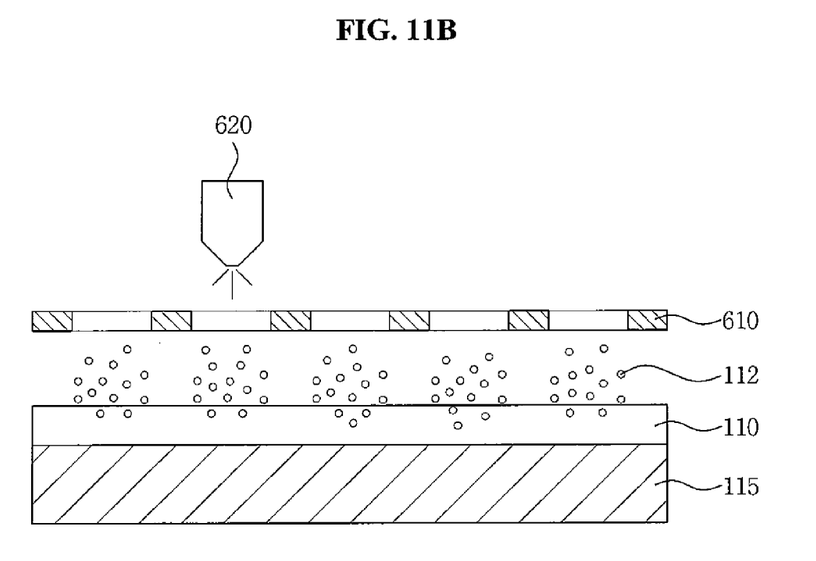

A screen 610 may be disposed on the light transmissive media-forming composition 110, and thereafter screen printing may be performed (see FIG. 11B). In one embodiment, light scattering particles 112 may be sprayed onto the screen 610 utilizing a light scattering particle-spraying nozzle 620, and then the light scattering particles 112 may selectively penetrate into the light transmissive media-forming composition 110. As a result, a plurality of light scattering patterns may be formed in a stripe shape.

Figure 11C:
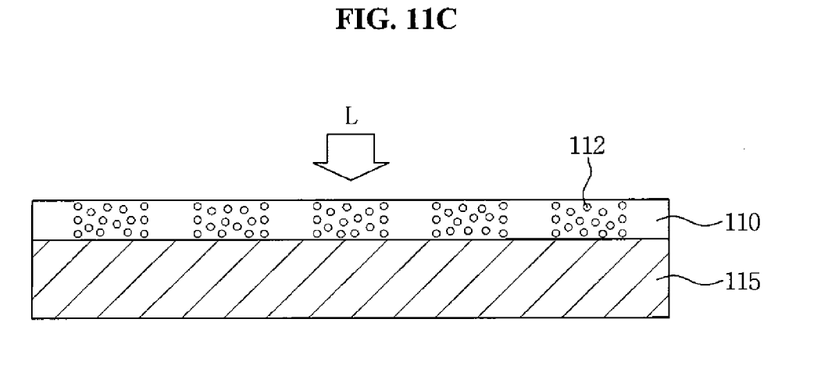

Next, light may be irradiated to the light transmissive media-forming composition 110 including the plurality of light scattering patterns so that the light transmissive media-forming composition 110 may be cured, thereby forming the optical film 101 (see FIG. 11C). The light transmissive media 111 may be formed by curing the light transmissive media-forming composition 110.

Hereinafter, a second method of manufacturing the optical film 101 according to the first embodiment will be described with reference to FIGS. 12A to 12E.

Figure 12A:
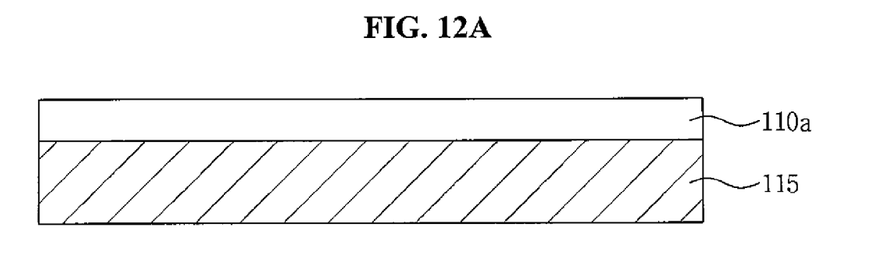
FIGS. 12A to 12E are schematic diagrams illustrating a second method for manufacturing an optical film.

A first light transmissive media-forming composition 110a may be coated on a release sheet 115 in the form of a film or films, and it may be then pre-cured (see FIG. 12A). The first light transmissive media-forming composition 110a may include a polymer resin.

Figure 12B:
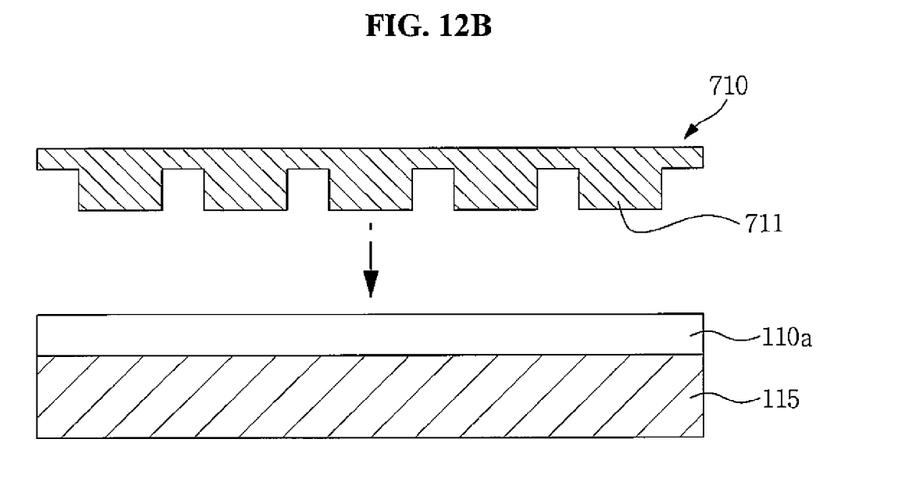

Pressure may be applied to the first light transmissive media-forming composition 110a utilizing an imprint 710 having a protrusion 711 (see FIG. 12B).

Figure 12C:
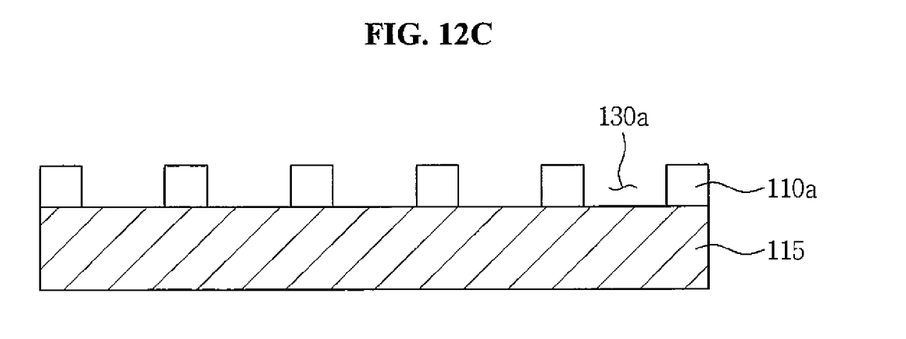

As a result of the application of pressure, a light transmission portion-forming engraved pattern 130a may be formed in the first light transmissive media-forming composition 110a (see FIG. 12C). A shape of the light transmission portion-forming engraved pattern 130a may vary depending on a shape of the protrusion 711 of the imprint 710.

Figure 12D:
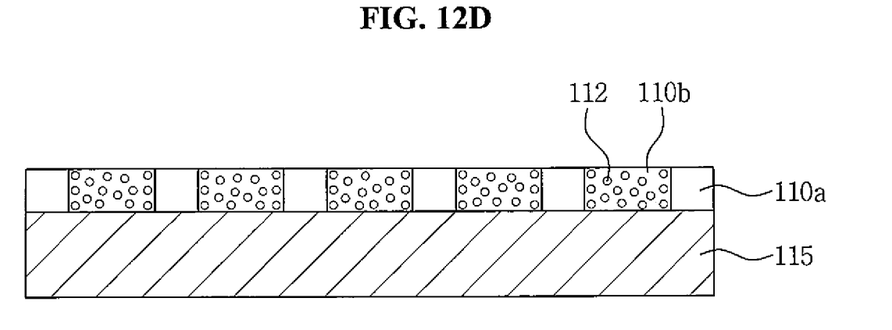

Next, the light transmission portion-forming engraved pattern 130a may be filled with a second light diffusion portion-forming composition 110b in which the light scattering particles 112 is dispersed (see FIG. 12D). The second light diffusion portion-forming composition 110b may include a polymer resin. The polymer resin included in the second light diffusion portion-forming composition 110b may be the same or substantially the same as the polymer resin included in the first light transmissive media-forming composition 110a.

Figure 12E:
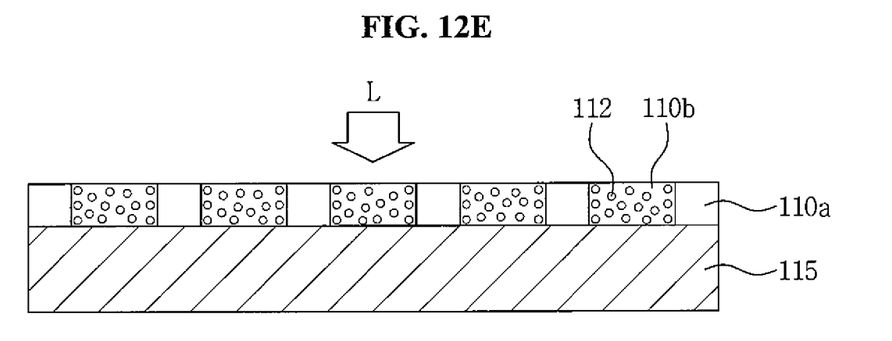

Next, the first light transmissive media-forming composition 110a and the second light diffusion portion-forming composition 110b may be cured to form the optical film 101 (see FIG. 12E).

The methods for manufacturing the optical film 101 are not limited to the above-described methods. The optical film 101 can be manufactured by various suitable methods that are known to those skilled in the art.

<Color Shift Experiments>

The optical film 101 illustrated in FIGS. 1 and 2 may be bonded to a display surface of an OLED panel so as to be applied to Experiments 1 and 2 that are conducted to test color shift. The sRGB color space that meets requirements of broadcasting standards may be applied to carry out simulations (Experiments 1 and 2).

In one embodiment, an optical film that has a thickness D of 30 μm and that includes the light diffusion portion 130 having a width W1 of 15 μm and having a haze value of 90%, and the light transmission portion 120 having a width W2 of 3 μm may be applied to Experiment 1, and an optical film that has a thickness of 30 μm and that includes the light diffusion portion 130 having a width W1 of 21 μm and having a haze value of 90%, and the light transmission portion 120 having a width W2 of 9 μm may be applied to Experiment 2.

An optical film having a thickness of 30 μm and including only the light transmission portion having a haze value of 90% without the light diffusion portion may be applied to Comparative example 1.

Standard color spaces for each color of red, green, and blue according to the sRGB color space and color spaces ((OLED panel (bare)) of colors of light emitted from an OLED panel may be compared to color spaces of the case where the optical films of Experiments 1 and 2 and Comparative example 1 are disposed on the OLED panel. In this case, degrees of front-facing color space shift may be compared to each other. The example results are shown in Table 1 below.

TABLE 1

| | Red color space | | Green color space | | Blue color space | | Color space |
|---|---|---|---|---|---|---|---|
| | Rx | Ry | Gx | Gy | Bx | By | match rate |
| Standard color space (sRGB) | 0.640 | 0.320 | 0.300 | 0.600 | 0.150 | 0.060 | — |
| OLED panel (bare) | 0.676 | 0.320 | 0.220 | 0.715 | 0.144 | 0.052 | 100% |
| Comparative example 1 | 0.613 | 0.329 | 0.193 | 0.705 | 0.144 | 0.056 | 94.6% |
| Experiment 1 | 0.632 | 0.326 | 0.203 | 0.718 | 0.144 | 0.056 | 100% |
| Experiment 2 | 0.656 | 0.323 | 0.213 | 0.719 | 0.144 | 0.055 | 100% |

In the case of the red Rx color space, the color space shift may be −0.063 in Comparative example 1 with respect to the OLED panel (bare) to which the optical film is not bonded, and the color space shifts may be −0.044 and −0.020 in Experiment 1 and Experiment 2, respectively, with respect to the OLED panel (bare) to which the optical film is not bonded. In the case of the green Gy color space, the color space shift may be −0.010 in Comparative example 1 with respect to the OLED panel (bare) to which the optical film is not bonded, and the color space shifts may be +0.003 and +0.004 in Experiment 1 and Experiment 2, respectively, with respect to the OLED panel (bare) to which the optical film is not bonded. In the case of the blue By color space, the color space shift may be +0.004 in Comparative example 1 with respect to the OLED panel (bare) to which the optical film is not bonded, and the color space shifts may be +0.004 and +0.003 in Experiment 1 and Experiment 2, respectively, with respect to the OLED panel (bare) to which the optical film is not bonded. Accordingly, the color space shift is reduced in the OLED panel with the optical films according to Experiments 1 and 2 compared to the OLED panel applied with the optical film according to Comparative example 1.

Further, the sRGB color space match rate is 94.6% in Comparative example 1, but the sRGB color space match rate is 100% in Experiment 1 and Experiment 2, which meets the requirements of broadcasting standards.

Hereinafter, a display device 201 according to a seventh embodiment will be described with reference to FIGS. 13 and 14.

Figure 13:
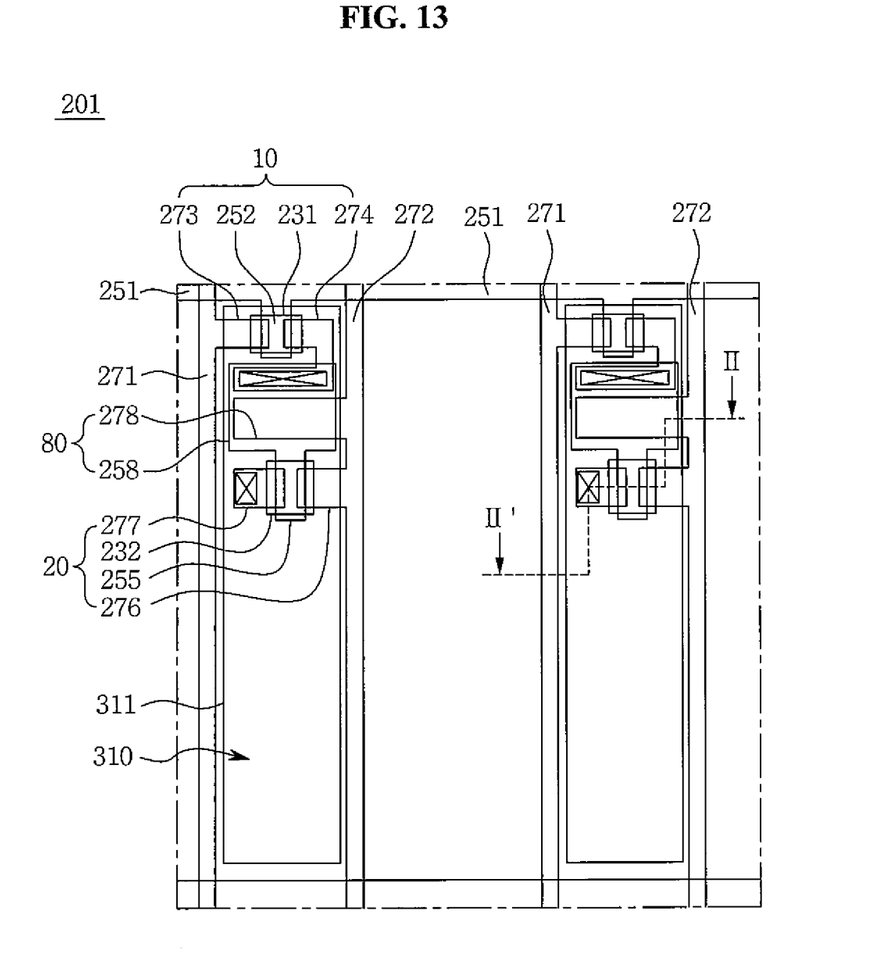
FIG. 13 is a plan structural diagram illustrating a display device according to a seventh embodiment of the present invention.

FIG. 13 is a plan structural diagram illustrating the display device 201 according to the seventh embodiment of the present invention. FIG. 14 is a cross-sectional view taken along line II-II' of FIG. 13.

The display device 201 according to the seventh embodiment includes a display panel and an optical film 101 in a display area (or surface) of the display panel. The optical film 101 may include a light diffusion portion 130 including light scattering particles dispersed in a light transmissive media and may also include a light transmission portion 120 including the light transmissive media. The light diffusion portion 130 may be adjacent the light transmission portion 120.

The display device according to the seventh embodiment may be an organic light emitting diode (OLED) display 201. As illustrated in FIGS. 13 and 14, the OLED display 201 according to the seventh embodiment includes a substrate 210, a driving circuit 230, an OLED 310, a protective layer 400, a window 500, and the optical film 101. The OLED display 201 may further include a buffer layer 220 and a pixel defining layer 290.

The substrate 210 may be an insulating substrate including, e.g., glass, quartz, ceramic, plastic, etc., but embodiments of the present invention are not limited thereto. The substrate 210 may also be a metal substrate made of stainless steel, etc.

The buffer layer 220 may be disposed on the substrate 210. The buffer layer 220 may include one or more layers selected from various suitable inorganic and organic layers. However, the buffer layer 220 may be omitted.

The driving circuit 230 may be disposed on the buffer layer 220. The driving circuit 230 may include a plurality of thin film transistors (TFTs) 10 and 20 and may drive the OLED 310. That is, the OLED 310 may emit light according to driving signals received from the driving circuit 230 so as to display an image.

Figure 14:
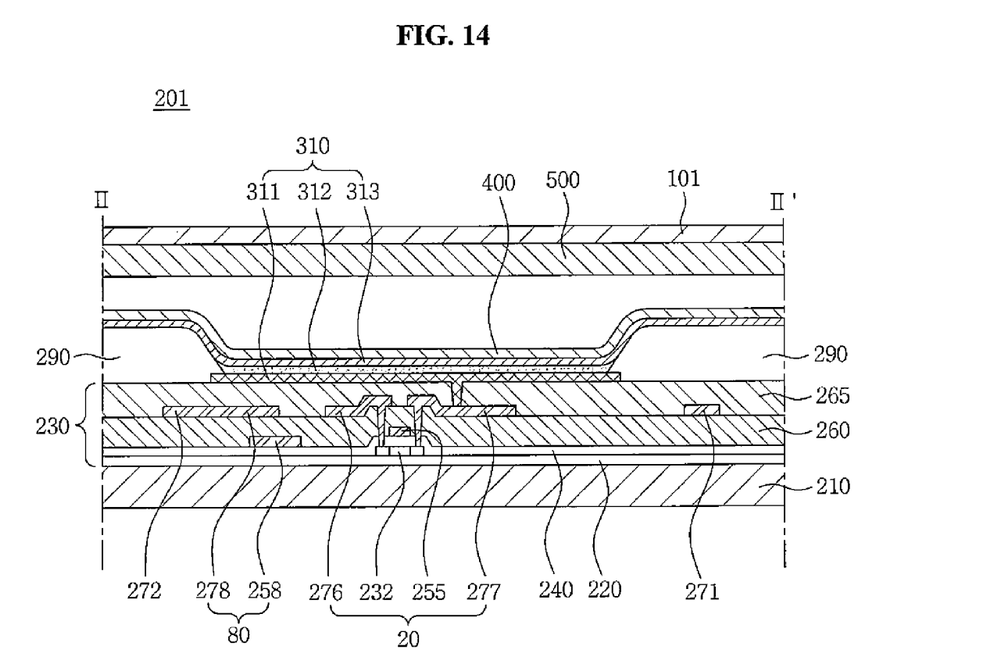
FIG. 14 is a cross-sectional view taken along line II-II' of FIG. 13.

Although FIGS. 13 and 14 illustrate an active-matrix OLED display with a 2Tr–1Cap structure, which includes two TFTs 10 and 20 and a capacitor 80 in one pixel, embodiments of the present invention are not limited thereto. In another implementation, the OLED display may include three or more TFTs and two or more capacitors in one pixel, or may be configured to have various suitable structures by further including separate (conductive) lines. Herein, the term "pixel" refers to the smallest unit that displays an image. The OLED display may display an image utilizing a plurality of pixels.

Every pixel may include a switching TFT 10, a driving TFT 20, a capacitor 80, and an organic light emitting diode (OLED) 310. The configuration including the switching TFT 10, the driving TFT 20, and the capacitor 80 may be called the driving circuit 230. The driving circuit 230 may further include a gate line 251 arranged along one direction and a data line 271 and a common power supply line 272, which are insulated from and intersecting (or crossing) the gate line 251. One pixel may be defined by the gate line 251, the data line 271, and the common power supply line 272, or it may be differently defined. For example, the pixel may be defined by a black matrix or a pixel defining layer (PDL).

The OLED 310 may include a first electrode 311, a light emitting layer 312 on the first electrode 311, and a second electrode 313 on the light emitting layer 312. The light emitting layer 312 may include a low molecular weight organic material or a high molecular weight organic material. Holes and electrons may be injected from the first and second electrodes 311 and 313 into the light emitting layer 312. The injected holes and electrons may be combined with each other to form an exciton, and light may be emitted when the exciton falls from an excited state to a ground state.

The capacitor 80 may include a pair of capacitor plates 258 and 278 with an interlayer insulating layer 260 interposed therebetween. The interlayer insulating layer 260 may be a dielectric material. Capacitance of the capacitor 80 may be determined by electric charges stored (e.g., energy charged) in the capacitor 80 and voltage between the pair of capacitor plates 258 and 278.

The switching TFT 10 may include a switching semiconductor layer 231, a switching gate electrode 252, a switching source electrode 273, and a switching drain electrode 274. The driving TFT 20 may include a driving semiconductor layer 232, a driving gate electrode 255, a driving source electrode 276, and a driving drain electrode 277. In addition, a gate insulating layer 240 may be provided to insulate the gate electrodes 252 and 255 from the semiconductor layers 231 and 232.

The switching TFT 10 may function as a switching device that selects a pixel to emit light. The switching gate electrode 252 may be coupled to the gate line 251. The switching source electrode 273 may be coupled to the data line 271. The switching drain electrode 274 may be spaced apart from the switching source electrode 273 and may be coupled to the capacitor plate 258.

The driving TFT 20 may apply driving power to the first electrode 311 (serving as a pixel electrode), which allows the light emitting layer 312 of the OLED 310 in a selected pixel to emit light. The driving gate electrode 255 may be coupled to the capacitor plate 258 coupled to the switching drain electrode 274. The driving source electrode 276 and the other capacitor plate 278 may be coupled to the common power supply line 272. The driving drain electrode 277 may be coupled to the first electrode 311 (serving as a pixel electrode) of the OLED 310 through a contact opening (e.g., hole) of a planarization layer 265.

With the above-described structure, the switching TFT 10 may be driven by a gate voltage applied to the gate line 251, and may function to transmit a data voltage applied to the data line 271 to the driving TFT 20. A voltage equivalent to a differential between a common voltage applied to the driving TFT 20 from the common power supply line 272 and the data voltage transmitted from the switching TFT 10 may be stored in the capacitor 80, and a current corresponding to the voltage stored in the capacitor 80 may flow to the OLED 310 through the driving TFT 20, so that the OLED 310 may emit light.

According to the seventh embodiment of the present invention, the first electrode 311 may be a reflective layer and the second electrode 313 may be a transflective layer. Therefore, light produced in the light emitting layer 312 may be emitted through the second electrode 313. That is, the OLED display according to the seventh embodiment may be a top emission device. However, the present invention is not limited thereto.

At least one selected from a hole injection layer (HIL) and a hole transport layer (HTL) may be disposed between the first electrode 311 and the light emitting layer 312. At least one selected from an electron transport layer (ETL) and an electron injection layer (EIL) may be disposed between the light emitting layer 312 and the second electrode 313.

The pixel defining layer (PDL) 290 may have an opening. The first electrode 311 may be partially exposed through the opening of the PDL 290. The first electrode 311, the light emitting layer 312, and the second electrode 313 may be sequentially laminated in the opening of the PDL 290. In this case, the second electrode 313 may be disposed on the light emitting layer 312 and also on the PDL 290. The hole injection layer, the hole transport layer, the electron transport layer, and the electron injection layer may also be disposed between the PDL 290 and the second electrode 313. In the OLED 310, light may be emitted from the light emitting layer 312 in the opening of the PDL 290. The PDL 290 may define the emission area.

The protective layer 400 may be disposed on the second electrode 313. The protective layer 400 may be configured to protect the OLED 310 from external environmental factors. The protective layer 400 may also be called a capping layer. A thin film encapsulation layer (not shown) in which inorganic and organic thin films are alternately laminated may be disposed on the protective layer 400.

The window 500 may be disposed on the protective layer 400. The window 500 may be configured to seal the OLED 310, together with the substrate 210. The window 500 may be made of an insulating material such as glass, quartz, ceramic, or plastic, similar to the substrate 210. The display panel may be from the substrate 210 to the window 500.

The optical film 101 may be disposed on the window 500. The optical film 101 may enable improvement of side color reproducibility and side visibility of the display device 201 and may also achieve improved front contrast and front color reproducibility of the display device 201.

As can be appreciated from the foregoing, various embodiments of the present invention have been described herein for purposes of illustration. Various modifications may be made without departing from the scope and spirit of the present invention as defined by the following claims and their respective equivalents.

What is claimed is:

1. An optical film comprising:
    a light diffusion portion comprising light scattering particles dispersed in a light transmissive media; and
    a light transmission portion comprising the light transmissive media,
    wherein the light transmissive media has the same refractive index in the light diffusion portion as in the light transmission portion,
    wherein the optical film has a thickness, a length, and a width, the thickness being smaller than the length and the width,
    wherein the light diffusion portion is adjacent the light transmission portion along the width of the optical film,
    wherein the optical film comprises a plurality of light diffusion portions alternatingly disposed between a plurality of light transmission portions,
    wherein the light diffusion portion comprises a first light diffusion portion having a haze value in a range of 60% to 80% and a second light diffusion portion having a haze value in a range of 90% to 98%, and
    wherein the first light diffusion portion and the second light diffusion portion are spaced apart by the light transmission portion.

2. The optical film of claim 1, wherein the light diffusion portion has a haze value of 60% or more and the light transmission portion has a haze value of 50% or less.

3. The optical film of claim 1, wherein the light diffusion portion has a width between 10 μm and 30 μm.

4. The optical film of claim 1, wherein the light transmission portion has a width between 2 μm and 15 μm.

5. The optical film of claim 1, wherein the light diffusion portion further comprises a third light diffusion portion having a haze value in a range of 80% to 90%.

6. The optical film of claim 1, wherein the light transmission portion comprises a plurality of portions that are spaced apart from one another along the width and the length of the optical film, and
    wherein the light diffusion portion comprises the light scattering particles dispersed in a portion of the light transmissive media, wherein the portion including the light scattering particles has a mesh structure when viewed from the top, the mesh structure being between the plurality of portions of the light transmission portion.

7. The optical film of claim 1, wherein the light diffusion portion comprises the light scattering particles dispersed in a plurality of portions of the light transmissive media, wherein the portions are spaced apart from one another along the width and the length of the optical film, and
wherein the light transmission portion, having a higher light transmittance than the light diffusion portion, has a mesh structure when viewed from the top, the mesh structure being between the plurality of portions of the light diffusion portion.

8. The optical film of claim 1, wherein the light diffusion portion has a thickness between 20 μm and 60 μm.

9. The optical film of claim 1, wherein a difference in the refractive index of the light transmissive media and a refractive index of the light scattering particles is in a range of 0.1 to 1.5.

10. The optical film of claim 1, wherein the light scattering particles comprise at least one selected from acrylic resin, polystyrene (PS) resin, polyvinyl chloride resin, polycarbonate (PC) resin, polyethylene terephthalate (PET) resin, polyethylene (PE) resin, polypropylene (PP) resin, polyimide (PI) resin, glass, and silica.

11. The optical film of claim 1, wherein the light scattering particles have an average particle size between 2 μm and 20 μm.

12. The optical film of claim 1, wherein the light transmissive media comprises at least one of polyester-based resin, acrylic resin, cellulose-based resin, polyolefin-based resin, polyvinyl chloride resin, polycarbonate-based resin, phenolic resin, and urethane resin.

13. The optical film of claim 1, wherein the light transmission portion is disposed between the first light diffusion portion and the second light diffusion portion and directly contacts the first light diffusion portion and/or the second light diffusion portion.

14. A display device comprising:
a display panel; and
an optical film in a display area of the display panel, wherein the optical film comprises:
a light diffusion portion comprising light scattering particles dispersed in a light transmissive media; and
a light transmission portion comprising the light transmissive media,
wherein the light transmissive media has the same refractive index in the light diffusion portion as in the light transmission portion,
wherein the optical film has a thickness, a length, and a width, the thickness being smaller than the length and the width,
wherein the light diffusion portion is adjacent the light transmission portion along the width of the optical film,
wherein the optical film comprises a plurality of light diffusion portions alternatingly disposed between a plurality of light transmission portions,
wherein the light diffusion portion comprises a first light diffusion portion having a haze value in a range of 60% to 80% and a second light diffusion portion having a haze value in a range of 90% to 98%, and
wherein the first light diffusion portion and the second diffusion portion are spaced apart by the light transmission portion.

15. The display device of claim 14, wherein the light diffusion portion has a haze value of 60% or more and the light transmission portion has a haze value of 50% or less.

16. The display device of claim 14, wherein the light diffusion portion further comprises a third light diffusion portion having a haze value in a range of 80% to 90%.

17. The display device of claim 14, wherein the light transmission portion comprises a plurality of portions that are spaced apart from one another along the width and the length of the optical film, and
wherein the light diffusion portion comprises the light scattering particles dispersed in a portion of the light transmissive media, wherein the portion including the light scattering particles has a mesh structure when viewed from the top, the mesh structure being between the plurality of portions of the light transmission portion.

18. The display device of claim 14, wherein the light transmission portion is disposed between the first light diffusion portion and the second light diffusion portion and directly contacts the first light diffusion portion and/or the second light diffusion portion.

* * * * *